(12) United States Patent
Zhu et al.

(10) Patent No.: US 11,959,804 B2
(45) Date of Patent: Apr. 16, 2024

(54) CURVED-SLIT IMAGING SPECTROMETER

(71) Applicant: SOOCHOW UNIVERSITY, Suzhou (CN)

(72) Inventors: Jiacheng Zhu, Suzhou (CN); Qiao Pan, Suzhou (CN); Xinhua Chen, Suzhou (CN); Weimin Shen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 276 days.

(21) Appl. No.: 17/636,844

(22) PCT Filed: Dec. 9, 2020

(86) PCT No.: PCT/CN2020/137813
§ 371 (c)(1),
(2) Date: Feb. 18, 2022

(87) PCT Pub. No.: WO2022/104992
PCT Pub. Date: May 27, 2022

(65) Prior Publication Data
US 2023/0332953 A1    Oct. 19, 2023

(30) Foreign Application Priority Data
Nov. 20, 2020    (CN) .......................... 202011314624.2

(51) Int. Cl.
*G01J 3/28* (2006.01)
*G01J 3/02* (2006.01)
*G01J 3/04* (2006.01)

(52) U.S. Cl.
CPC ............. *G01J 3/2823* (2013.01); *G01J 3/021* (2013.01); *G01J 3/0218* (2013.01); *G01J 3/04* (2013.01)

(58) Field of Classification Search
CPC ........ G01J 3/28; G01J 3/14; G01J 3/18; G01J 3/02; G01J 3/2823; G01J 3/021;
(Continued)

(56) References Cited

U.S. PATENT DOCUMENTS

| 4,017,185 A | * | 4/1977 | Chupp | ...................... G01J 3/18 356/333 |
| 4,773,756 A | * | 9/1988 | Blechinger | ........... G01J 3/2823 356/334 |

(Continued)

FOREIGN PATENT DOCUMENTS

| CN | 106885629 A | 6/2017 |
| CN | 109682469 A | 4/2019 |
| CN | 110108357 A | 8/2019 |

OTHER PUBLICATIONS

E Oliva et al., "Updated optical design and trade-off study for MOONS, the Multi-Object Optical and Near Infrared spectrometer for the VLT" Proceedings of SPIE, vol. 9147, pp. 91472C-1-9147C-10.

*Primary Examiner* — Abdullahi Nur
(74) *Attorney, Agent, or Firm* — SZDC Law PC

(57) ABSTRACT

The invention provides a curved-slit imaging spectrometer, wherein a fiber bundle transfers a straight line image of a front objective lens to a curved slit, and the front objective lens doesn't need to have a curved image plane to directly abut the spectrometer, so that the system is less complicated, and the front objective lens and spectrometer have a simple structure. The arc-shaped or approximately arc-shaped curved slit matches the optimum imaging circle of the Offner-type spectrometer, thereby achieving an extra-long slit. The arced slit is 5 to 10 times longer than the straight slit of the classical Offner-type spectrometer. In the case of a compact size, the length of the slit can be greater than 100 mm. Also, the same spectral response function applies in
(Continued)

different fields of view while presenting desirable imaging quality.

9 Claims, 4 Drawing Sheets

(58) Field of Classification Search
CPC .......... G01J 3/0218; G01J 3/04; G01J 3/0208; G01J 3/024
See application file for complete search history.

(56) References Cited

U.S. PATENT DOCUMENTS

| | | | |
|---|---|---|---|
| 6,636,305 B2* | 10/2003 | Zhao | G01J 3/04 356/326 |
| 7,636,158 B1* | 12/2009 | Pawluczyk | G01J 3/0208 356/326 |
| 8,233,148 B2* | 7/2012 | Bodkin | G01J 3/0235 356/328 |
| 2003/0071993 A1* | 4/2003 | Zhao | G01J 3/28 356/334 |
| 2004/0090623 A1 | 5/2004 | Richman | |
| 2007/0060806 A1* | 3/2007 | Hunter | A61B 5/1455 600/316 |
| 2007/0165220 A1* | 7/2007 | Brady | G01J 3/0218 356/310 |
| 2017/0071509 A1* | 3/2017 | Pandey | A61B 5/0075 |

\* cited by examiner

CURVED-SLIT IMAGING SPECTROMETER

This application is the National Stage Application of PCT/CN2020/137813, filed on Dec. 19, 2020, which claims priority to Chinese Patent Application No. 202011314624.2, filed on Nov. 20, 2020, which is incorporated by reference for all purposes as if fully set forth herein.

FIELD OF THE INVENTION

The present invention relates to the technical field of spectral imaging, and more particularly to a curved-slit imaging spectrometer.

DESCRIPTION OF THE RELATED ART

In 1980s, in response to the demand of development of earth observation application, imaging spectroscopy technology has arisen. It is an emerging field integrating space imaging technology and spectral imaging technology, which greatly broadens human's researches in aerospace remote sensing, agricultural and forestry resource exploration, mineral resource and geological exploration, military detection, biomedicine and so on.

Imaging spectrometers consist of a front objective lens and a spectrometer, and are generally divided into a dispersive type, an interference type, etc. The traditional dispersive imaging spectrometer directly images to a slit, which is the object plane of the spectrometer, by the front objective lens, and the light passing through the slit is then split and reimaged by the spectrometer. Although the existing structure can well meet the requirements of instrument metrics when the straight slit is short, for a long slit system which needs to meet the requirements of wide width and high spatial resolution, substantial aberration exists and the spectral image tends to be distorted.

In order to achieve wide width, field splicing is usually adopted to divide the long slit system into a plurality of medium and short slit systems, but the joined system has a complex structure and a bulky size. However, spaceborne imaging spectrometers generally have stricter requirements on geometric physical quantities such as weight and size of the instrument. Excessive size and weight lead to sharp increase in the cost of production, manufacture and launch of the instrument.

Most of the existing imaging spectrometers are medium and short slit systems, all of which adopt straight slits having a length less than 30 mm. Increase in the slit length causes rapid increase in the aberration of the optical system, so that it is difficult to meet the application requirements of wide width and high spatial resolution with a single spectrometer. Imaging spectrometers with slit length exceeding 100 mm have been rarely reported. At the end of 1980s, Wynne proposed to introduce a meniscus lens into an Offner-type relay system for one-to-one imaging, which can compensate spherical aberration and astigmatism in the case of a long slit and achieve good imaging quality. After the onset of research on Offner-type spectrometers, many scholars have further developed and improved the theory of Offner-Wynne spectrometers, which can obtain a longer slit than the classical Offner-type spectrometer. However, a new problem was caused by the introduction of a meniscus lens, that is, fabricating a grating on the surface of the meniscus lens involves high cost. Also, the meniscus lens surface has a large incident angle, which causes polarization in imaging spectrometers. Therefore, it is urgent to propose an imaging spectrometer with a simple structure, a compact size and a long slit to meet the requirements of wide width and high spatial resolution in aerospace remote sensing applications.

SUMMARY OF THE INVENTION

The present invention is intended to provide a curved-slit imaging spectrometer optical system having the advantages of a long slit, a simple structure, a compact size, desirable imaging quality etc. This system is applicable to hyperspectral remote sensing with wide width, high spatial resolution, and medium or high spectral resolution.

In order to solve the above problem, the present invention utilizes the following technical solution.

A curved-slit imaging spectrometer includes a front objective lens, a fiber bundle, a curved slit, an Offner-type spectrometer and a focal plane detector.

The front objective lens images a target scene. The fiber bundle transfers a straight line image produced by the front objective lens to the curved slit which is an arc-shaped or approximately arc-shaped. The light enters the Offner-type spectrometer through the curved slit and is then spectrally split and reimaged by the Offner-type spectrometer onto the focal plane detector.

Preferably, the front objective lens is a transmissive objective lens, a reflective objective lens or a catadioptric objective lens.

Preferably, the Offner-type spectrometer includes a concave mirror and a convex grating that are coaxially arranged. The incident light ray from the curved slit is reflected by the concave mirror and is incident on the convex grating as a convergent beam and spectrally split. The split light is then imaged by the concave mirror to the focal plane detector to complete spectral imaging.

Preferably, the incident end face of the fiber bundle is arranged in a straight line in coincidence with the image produced by the front objective lens, and the exit end face of the fiber bundle is arranged in an arc in coincidence with the curved slit.

Preferably, the curved slit is positioned in coincidence with the optimum imaging circular field of the Offner-type spectrometer or close thereto, and the circle center of the arc of the curved slit is positioned on or close to the optical axis of the Offner-type spectrometer.

Preferably, if the radius of the concave mirror of the Offner-type spectrometer is $R_1$, the curvature radius of the convex grating is $R_2$, and the radius of the optimum circular field of the Offner-type spectrometer is r, then $$r = R_1 \sqrt{1 - \frac{R_1^2}{4R_2^2}}.$$

The curved slit is an arc of a radius $r_s$ or an approximately arced curve between two arcs of radii $r_1$ and $r_2$, wherein $r_1 = 0.8r$, $r_2 = 1.2r$, $r_1 \leq r_s \leq r_2$.

Preferably, the front objective lens and the Offner-type spectrometer have the same numerical aperture. The numerical aperture of the fiber bundle is greater than or equal to that of the front objective lens. The fiber core of the fiber bundle has a diameter in the range of 5 to 50 μm.

Preferably, the ratio of the curvature radius of the concave mirror to the curvature radius of the convex grating is 1.9:1 to 2.2:1 and the distance between the sphere centers thereof is less than $0.1R_2$.

Preferably, the shape of the spectral line generated on the focal plane detector is consistent with the shape of the curved slit. This spectral line is transformed into a straight spectral line corresponding to pixels in object plane through a mapping transformation algorithm. This mapping consists in transforming the equation for the arced spectral line $y_1 = r_s - \sqrt{r_s^2 - x_1^2}$ into the equation for the straight spectral line $$\begin{cases} y_2 = k \\ x_2 = a \tan\left(\dfrac{y_1}{x_1}\right) \cdot r_s \end{cases},$$

where k is a constant.

The present invention has the following beneficial effects.

According to the present invention, the fiber bundle transfers the straight image of the front objective lens to the curved slit without the necessity for the front objective lens to have a curved image plane to directly abut the spectrometer, so that the system is less complicated, and the front objective lens and spectrometer have a simple structure. The arced or approximately arced curved slit matches the optimum imaging circle of the Offner-type spectrometer, thereby achieving an extra-long slit. The arced slit is 5 to 10 times longer than the straight slit of the classical Offner-type spectrometer. In the case of a compact size, the length of the slit can be greater than 100 mm. Also, the same spectral response function applies in different fields of view, while presenting desirable image quality, and this system is applicable to hyperspectral remote sensing with wide width, high spatial resolution, and medium or high spectral resolution.

REFERENCE NUMERALS

Figure 1:
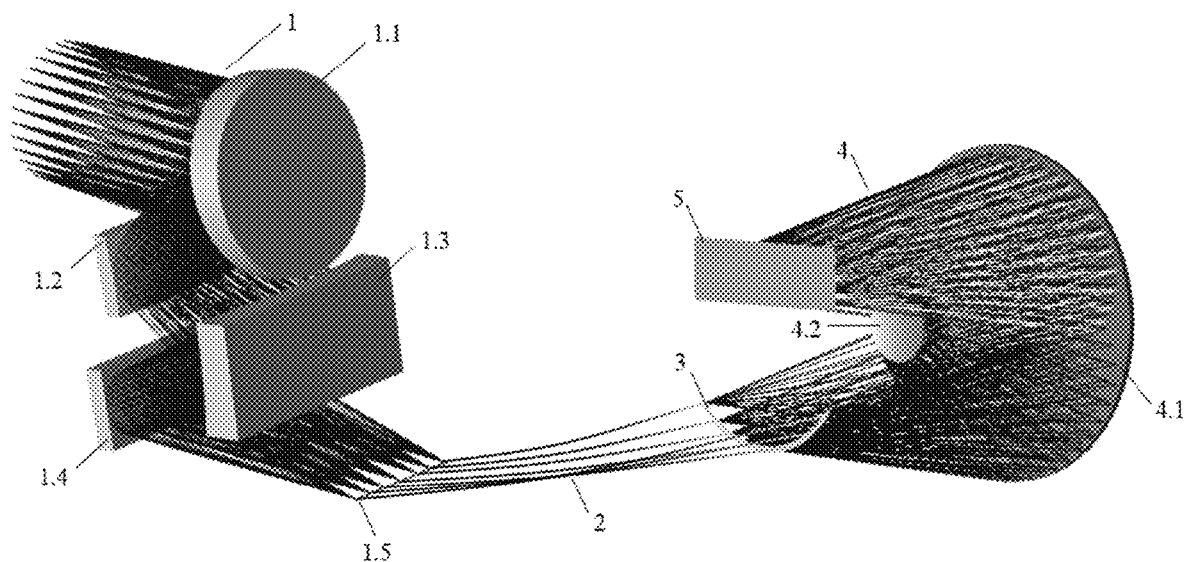
FIG. 1 is a dimensional view of the optical path of a curved-slit imaging spectrometer according to the present invention.

1 front objective lens; 1.1 primary mirror of front objective lens; 1.2 secondary mirror of front objective lens; 1.3 tertiary mirror of front objective lens; 1.4 fold mirror of front objective lens; 1.5 image plane of front objective lens; 2 fiber bundle; 3 curved slit; 4 Offner-type spectrometer; 4.1 concave mirror; 4.2 convex grating; 5 focal plane detector; 6 curved spectral line image; 7 straight spectral line image

DETAILED DESCRIPTION OF THE PREFERRED EMBODIMENTS

The present invention will be further illustrated below with reference to the drawings and embodiments, so that those skilled in the art can better understand and implement the present invention, but the described embodiments are not intended as limitations of the present invention.

As shown in FIGS. 1-6, a curved-slit imaging spectrometer includes a front objective lens, a fiber bundle, a curved slit, an Offner-type spectrometer and a focal plane detector.

The front objective lens images a target scene. The fiber bundle transfers the straight line image produced by the front objective lens to the curved slit. The curved slit has an arced shape or an approximately arced shape. The light ray enters the Offner-type spectrometer through the curved slit and is then split and imaged by the Offner-type spectrometer onto the focal plane detector.

According to the present invention, a fiber image transfers the straight line image plane of the front objective lens to the curved slit, and the front objective lens doesn't need to have a curved image plane to directly abut the spectrometer, so that the system is less complicated, and the front objective lens and spectrometer have a simple structure. The arced or approximately arced curved slit matches the optimum imaging circle of the Offner-type spectrometer, thereby achieving an extra-long slit. The arced slit is 5 to 10 times longer than the straight slit of the classical Offner-type beam splitting device. In the case of a compact size, the slit can have a length greater than 100 mm. Also, the same spectral response function applies in different view fields, while presenting desirable image quality, and this system is applicable to hyperspectral remote sensing with wide width, high spatial resolution, and medium and high spectral resolution.

The present invention can meet the requirements of wide-width and high spatial resolution of spaceborne imaging spectrometers and overcome the limitation of short length of straight slits in existing imaging spectrometers.

The image produced by the front objective lens has the same length as the arc length of the curved slit.

The front objective lens is a transmissive objective lens, a reflective objective lens or a catadioptric objective lens.

The front objective lens is an off-axis three-mirror reflective telescopic objective lens that includes a primary mirror of front objective lens, a secondary mirror of front objective lens, a tertiary mirror of front objective lens, a fold mirror of front objective lens, and an image plane of front objective lens. The image of the target scene is transferred sequentially through the primary mirror of front objective lens, the secondary mirror of front objective lens, the tertiary mirror of front objective lens, the fold mirror of front objective lens, and finally through the image plane of front objective lens to the fiber bundle.

The Offner-type spectrometer includes a concave mirror and a convex grating that are coaxially arranged. The incident light from the curved slit is reflected by the concave mirror and is incident on the convex grating as a convergent beam and spectrally split. The split light is then imaged by the concave mirror to the focal plane detector to complete spectral imaging.

Specifically, the Offner-type spectrometer consists of a concave mirror and a convex grating that are coaxially arranged.

The curved slit is positioned in coincidence with the optimum imaging circular field of the Offner-type spectrometer or close thereto, and the circle center of the arc of the curved slit is positioned on or close to the optical axis of the Offner-type spectrometer.

The incident light from the curved slit is reflected by the concave mirror and is incident on the convex grating as a convergent beam. The convergent beam is spectrally split through diffraction by the convex grating, and is converted into a divergent beam. Finally, the splittd beam is imaged by the concave mirror to the focal plane detector to complete spectral imaging.

The resultant spectral image has a curved shape that does not fill the focal plane detector completely. The mean gray-level value $I_N$ of pixels at a location without the spectral image is subtracted from the gray-level value $I_s$ of pixels at a location with the spectral image on the focal plane detector to correct the background noise and dark current noise, to obtain the denoised spectral data.

Some pixels on the focal plane detector of this imaging spectrometer cannot receive the spectral image and these pixels can be used for background noise and dark current noise correction to obtain denoised hyperspectral data to improve the fidelity of the data.

The incident end of the fiber bundle is arranged in a straight line in coincidence with the image produced by the front objective lens, and the exit end face of the fiber bundle is arranged in an arc in coincidence with the curved slit.

If the radius of the concave mirror of the Offner-type spectrometer is $R_1$, the curvature radius of the convex grating is $R_2$, and radius of the optimum circular field of the Offner-type spectrometer is r, then $$r = R_1 \sqrt{1 - \frac{R_1^2}{4R_2^2}}.$$

The curved slit is an arc of a radius $r_s$ or an approximately arced curve between two arcs of radii $r_1$ and $r_2$, wherein $r_1=0.8r$, $r_2=1.2r$, $r_1 \leq r_s \leq r_2$.

The front objective lens and the Offner-type spectrometer have the same numerical aperture. The numerical aperture of the fiber bundle is greater than or equal to that of the front objective lens. The fiber core of the fiber bundle has a diameter in the range of 5 to 50 μm.

The ratio of the curvature radius of the concave mirror to the curvature radius of the convex grating is 1.9:1 to 2.2:1 and the distance between the sphere centers thereof is less than $0.1R_2$.

The shape of the spectral line generated on the focal plane detector is consistent with the shape of the curved slit. This spectral line is transformed into a straight spectral line corresponding to pixels in object plane through a mapping transformation algorithm. This mapping consists in transforming the equation for the arced spectral line $y_1 = r_s - \sqrt{r_s^2 - x_1^2}$ into the equation for the straight spectral line $$\begin{cases} y_2 = k \\ x_2 = a \tan\left(\frac{y_1}{x_1}\right) \cdot r_s \end{cases},$$

where k is a constant.

Figure 2:
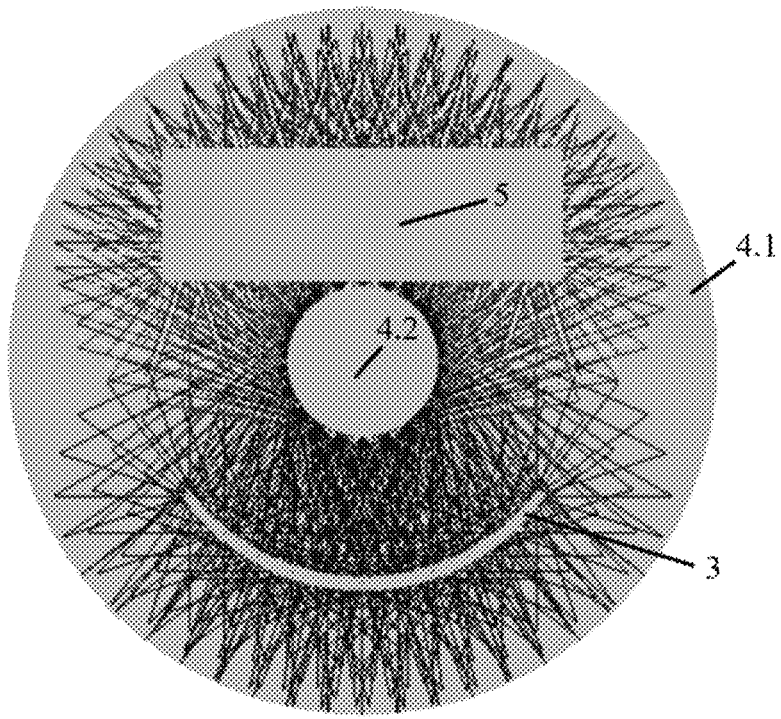
FIG. 2 is an axial view of the optical path of an Offner-type spectrometer in a curved-slit imaging spectrometer according to the present invention.

Referring to FIG. 2, it shows an axial view of the optical path of an Offner-type spectrometer in a curved-slit imaging spectrometer according to the present invention. As can be seen from this figure, the concave mirror and the convex grating are coaxial, and their axis is the optical axis of the Offner-type spectrometer. The circle center of the arc of the curved slit is positioned close to this optical axis, and the expression "close to" means it is within a radius of 2-5 centimeters from the optical axis as the circle center.

Figure 3:
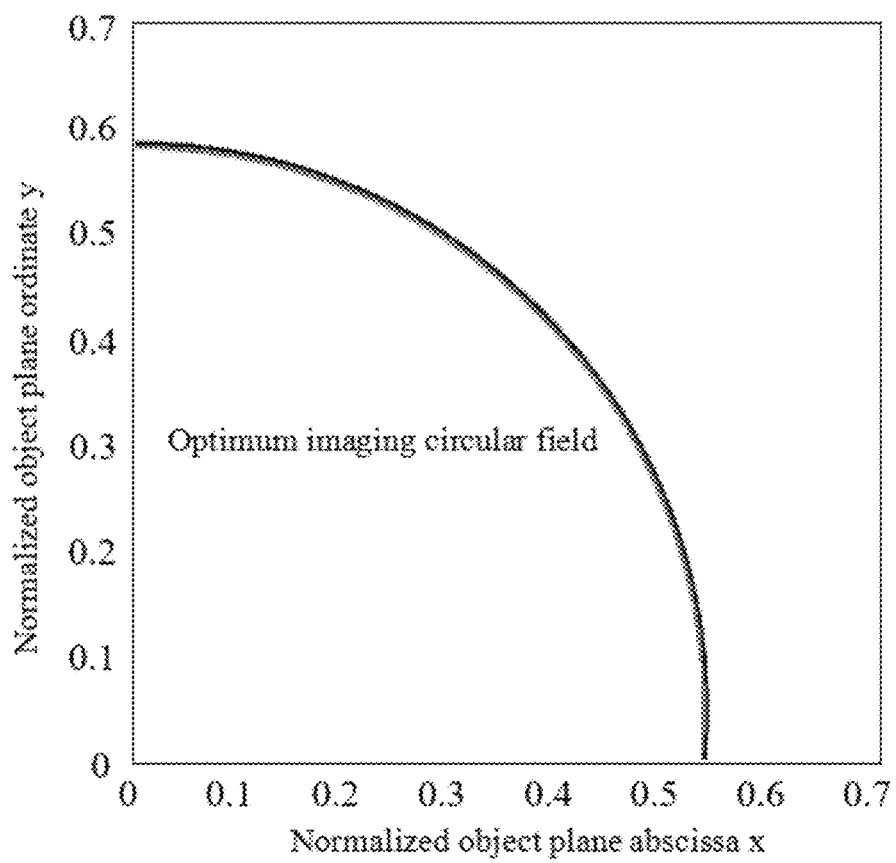
FIG. 3 shows an optimum imaging circular field in a ¼ object plane of an Offner-type spectrometer in a curved-slit imaging spectrometer according to the present invention.

Referring to FIG. 3, it shows an optimum imaging circular field in the object plane of the Offner-type spectrometer, the location of the curved slit in the object plane is in coincidence with this optimum imaging circular field.

Figure 4:
FIG. 4 shows a curved spectral line image generated on a focal plane detector and a straight spectral line image after mapping transformation of a curved-slit imaging spectrometer according to the present invention.

With reference to FIG. 4, the imaging magnification of the Offner-type spectrometer is 1:1. The curved spectral line image generated on the focal plane detector is of the same shape as the curved slit. After mapping transformation, a straight line image is obtained. Length of the curved spectral line image is the same as that of the straight spectral line image. The interval between spectral lines of different wavelengths in the curved spectral line image is the same as the interval between spectral lines of different wavelengths in the straight spectral line image, and the spectral lines of different wavelengths in the straight spectral line image are parallel to each other.

In one embodiment, with reference to FIG. 1, the proposed curved-slit imaging spectrometer has the following metrics:

Spectral range: 400-1000 nm;
F number of the system: 3;
Field of view: 10.22°;
Focal length: 560 mm;
Slit length: 100 mm;
Spectral resolution: 2 nm;
Dispersion width on image plane: 6 mm;
Detector pixel size: 20 μm×20 μm;
Detector dimensions: 2560×1280.

In this embodiment, the specific optical parameters of various optical elements are shown in Table 1, in which "surface type" indicates the name of various optical surfaces, "curvature radius" indicates the radius of various optical surfaces, "distance" indicates the lateral distance between the vertex of this optical surface and the vertex of the next optical surface. The groove density of the convex grating is 89 Lp/mm. The diameter of the fiber core is 20 μm. Each fiber corresponds to a detector pixel. A total of 5000 fibers are used. The length of the fiber is 20 cm. The arc radius of the curved slit is 53.8 mm, the arc length is 100 mm, and the off-axis displacement of the curved slit is 55.2 mm. The off-axis displacement of the focal plane detector is 36.5 mm.

Table 1 optical parameters of the curved-slit imaging spectrometer

| Surface type | Curvature radius/mm | distance/mm |
| --- | --- | --- |
| Primary mirror of front objective lens | 838.6<br>Secondary aspherical coefficient: −4.054 | −158.9 |
| Secondary mirror of front objective lens | 318.4<br>Secondary aspherical coefficient: −1.523 | 179.6 |
| Tertiary mirror of front objective lens | 540.8<br>Secondary aspherical coefficient: −0.403 | −200.3 |
| Fold mirror of front objective lens | ∞ | 297.7 |
| curved slit | 53.8 | 206.7 |
| concave mirror | 216.9 | −105.1 |
| convex grating | 112.4 | 105.1 |
| concave mirror | 216.9 | −206.3 |
| focal plane detector | ∞ | — |

Figure 5:
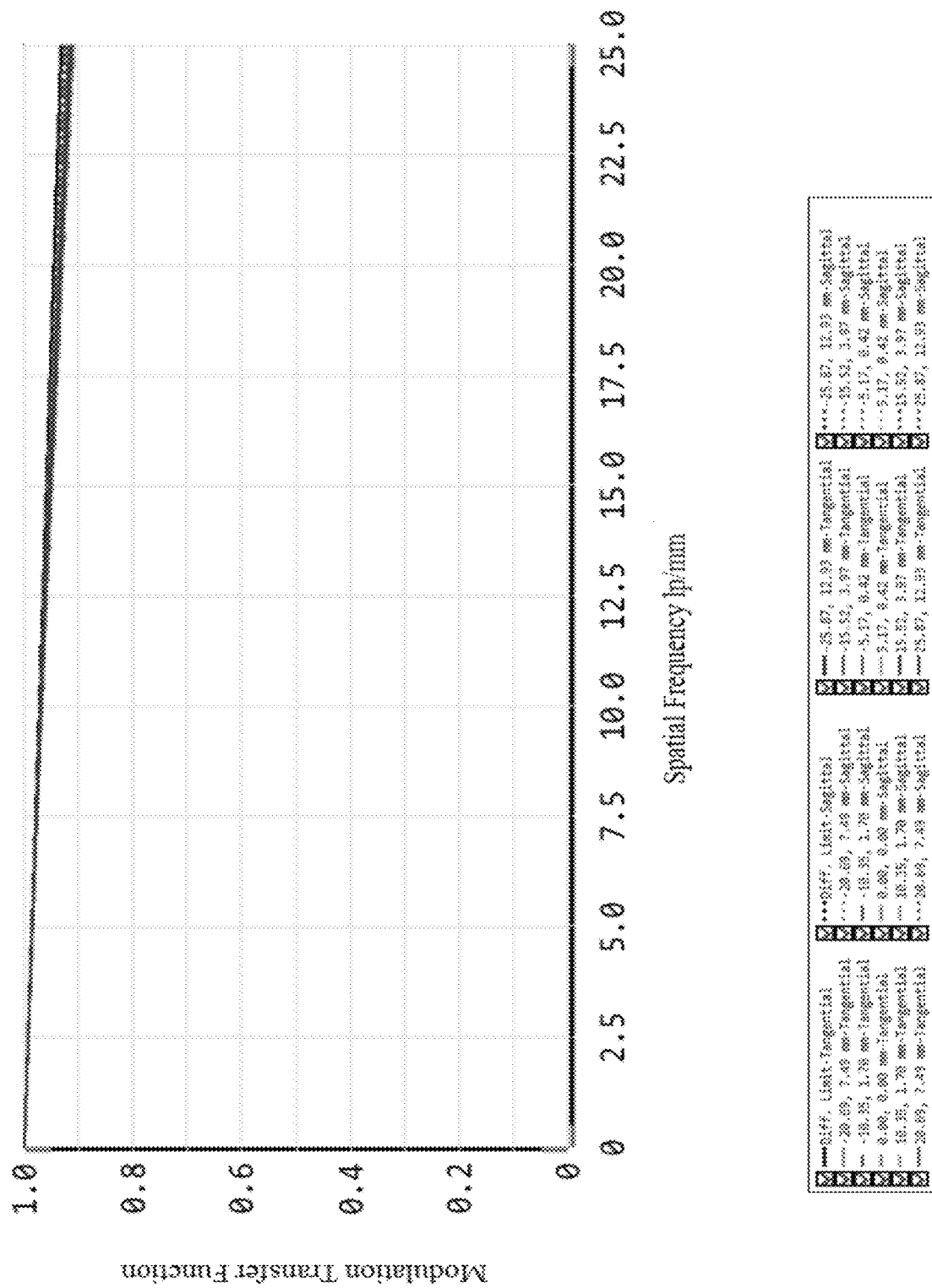
FIG. 5 shows a modulation transfer function curve of a curved-slit imaging spectrometer according to an embodiment of the present invention.

Referring to FIG. 5, it shows a modulation transfer function curve of a curved-slit imaging spectrometer according to this embodiment. This spectrometer has a modulation transfer function greater than 0.91 at a Nyquist frequency of 25 Lp/mm of the detector, which is close to the diffraction limit. The image quality is desirable, and the modulation transfer function has consistent performance in different view fields, indicating the consistency of the spectral response function.

Figure 6:
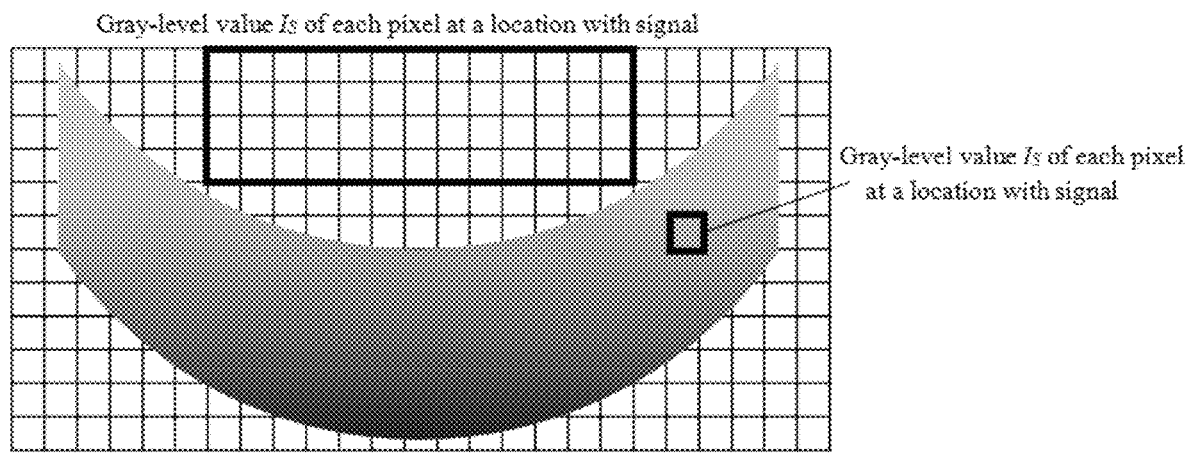
FIG. 6 is a schematic view of a spectral image generated by a focal plane detector of a curved-slit imaging spectrometer and pixel ranges for background noise and dark current noise correction according to an embodiment of the present invention.

Referring to FIG. 6, it is a schematic view of a spectral image generated by a focal plane detector of a curved-slit imaging spectrometer and the pixel range for background noise and dark current noise correction according to this embodiment. The mean gray-level value $I_N$ of pixels at a location without the spectral image is subtracted from the gray-level value $I_S$ of each pixel at a location with the spectral image to remove the background noise and dark current noise, to obtain the denoised spectral data $I_S-I_N$.

The above-mentioned embodiments are only preferred embodiments for fully explaining the present invention and the scope of protection of the present invention is not limited thereto. Any equivalent substitution or variation made by people skilled in the art on the basis of the present invention shall fall within the protection scope of the present invention. The protection scope of the invention is defined by the claims.

What is claimed is:

1. A curved-slit imaging spectrometer comprising a front objective lens, a fiber bundle, a curved slit, an Offner-type spectrometer and a focal plane detector, wherein:
the front objective lens images a target scene, the fiber bundle transfers a straight line image produced by the front objective lens to the curved slit which is arc-shaped or approximately arc-shaped, and a light ray enters the Offner-type spectrometer through the curved slit and is then spectrally split and reimaged onto the focal plane detector.

2. The curved-slit imaging spectrometer of claim 1, wherein the front objective lens is a transmissive objective lens, a reflective objective lens or a catadioptric objective lens.

3. The curved-slit imaging spectrometer of claim 1, wherein the Offner-type spectrometer comprises a concave mirror and a convex grating that are coaxially arranged, the incident light from the curved slit is reflected by the concave mirror and is incident on the convex grating as a convergent beam and spectrally split on the convex grating, and then imaged by the concave mirror to the focal plane detector to complete spectral imaging.

4. The curved-slit imaging spectrometer of claim 1, wherein incident end of the fiber bundle is arranged in a straight line in coincidence with the image produced by the front objective lens, and exit end of the fiber bundle is arranged in an arc in coincidence with the curved slit.

5. The curved-slit imaging spectrometer of claim 4, wherein the curved slit is positioned in coincidence with the optimum imaging circular field of the Offner-type spectrometer or close thereto, and the circle center of the arc of the curved slit is positioned on or close to the optical axis of the Offner-type spectrometer.

6. The curved-slit imaging spectrometer of claim 4, wherein if a radius of the concave mirror of the Offner-type beam splitting device is $R_1$, a curvature radius of the convex grating is $R_2$, and a radius of the optimum circular field of the Offner-type spectrometer is r, then $$r = R_1 \sqrt{1 - \frac{R_1^2}{4R_2^2}},$$

and
the curved slit is an arc of a radius $r_s$ or an approximately arced curve between two arcs of radii $r_1$ and $r_2$, wherein $r_1=0.8r$, $r_2=1.2r$, $r_1 \leq r_s \leq r_2$.

7. The curved-slit imaging spectrometer of claim 1, wherein the front objective lens and the Offner-type spectrometer have the same numerical aperture, a numerical aperture of the fiber bundle is greater than or equal to that of the front objective lens, and a fiber core of the fiber bundle has a diameter in the range of 5 to 50 μm.

8. The curved-slit imaging spectrometer of claim 7, wherein the ratio of curvature radius of the concave mirror to a curvature radius of the convex grating is 1.9:1 to 2.2:1 and the distance between sphere centers thereof is less than $0.1R_2$.

9. The curved-slit imaging spectrometer of claim 7, wherein the shape of the spectral line generated on the focal plane detector is consistent with the shape of the curved slit, this spectral line is transformed into a straight spectral line corresponding to pixels in object plane through a mapping transformation algorithm, and this mapping consists in transforming the equation for the arced spectral line $y_1 = r_s - \sqrt{r_s^2 - x_1^2}$ into the equation for the straight spectral line $$\begin{cases} y_2 = k \\ x_2 = a \tan\left(\frac{y_1}{x_1}\right) \cdot r_s \end{cases},$$

where k is a constant.

* * * * *